(12) United States Patent
Shibuya et al.

(10) Patent No.: US 8,495,761 B2
(45) Date of Patent: Jul. 23, 2013

(54) PLANAR POSITIONING DEVICE AND INSPECTION DEVICE PROVIDED WITH THE SAME

(75) Inventors: Yotsugi Shibuya, Akita (JP); Shigeki Mori, Akita (JP); Kazuto Miyawaki, Akita (JP); Akihiro Naganawa, Akita (JP)

(73) Assignee: Akita Prefecture, Akita-shi (JP)

( * ) Notice: Subject to any disclaimer, the term of this patent is extended or adjusted under 35 U.S.C. 154(b) by 60 days.

(21) Appl. No.: 13/206,554

(22) Filed: Aug. 10, 2011

(65) Prior Publication Data

US 2011/0321203 A1    Dec. 29, 2011

Related U.S. Application Data

(63) Continuation of application No. PCT/JP2010/051900, filed on Feb. 9, 2010.

(30) Foreign Application Priority Data

Feb. 10, 2009    (JP) ................... 2009-028029

(51) Int. Cl.
*G21K 5/08*    (2006.01)
*G21K 5/10*    (2006.01)
*G01Q 10/00*    (2010.01)
*H01L 41/00*    (2006.01)

(52) U.S. Cl.
USPC ............... 850/8; 850/1; 850/2; 850/3; 850/9; 250/440.11; 74/128

(58) Field of Classification Search
USPC ............... 850/1–3, 8–10, 18, 22, 37, 39–41, 850/62, 63; 74/1 R, 99, 111, 112, 113, 117, 74/128, 130; 310/309, 310; 414/22.55, 22.65
See application file for complete search history.

(56) References Cited

U.S. PATENT DOCUMENTS 3,839,652 A * 10/1974 Schafft ..................... 310/330
5,824,979 A * 10/1998 Dam et al. ................. 200/61.88
(Continued)

FOREIGN PATENT DOCUMENTS

JP    4-256534    9/1992
JP    2003-98059    4/2003
(Continued)

OTHER PUBLICATIONS

International Search Report mailed May 18, 2010 in PCT/JP2010/051900 filed Feb. 9, 2010 (with English Translation).

(Continued)

*Primary Examiner* — Bernard E Souw
(74) *Attorney, Agent, or Firm* — Oblon, Spivak, McClelland, Maier & Neustadt, L.L.P.

(57) ABSTRACT

According to one embodiment, a planar positioning device includes a first actuator displaceable in a first axis direction, a second actuator displaceable in a second axis direction perpendicular to the first axis, a first displacement magnifying mechanism configured to magnify a displacement of the first actuator, a second displacement magnifying mechanism configured to magnify a displacement of the second actuator, a stage arranged in a plane, a first drive support mechanism including a parallel link connected between the first displacement magnifying mechanism and the stage to transmit the magnified displacement in the first-axis direction to the stage, a second drive support mechanism including a parallel link connected between the second displacement magnifying mechanism and the stage to transmit the magnified displacement in the second-axis direction to the stage, and a stabilizing support mechanism configured to apply tensions in the first-axis direction and the second-axis direction to the stage.

14 Claims, 10 Drawing Sheets

U.S. PATENT DOCUMENTS

| | | | |
|---|---|---|---|
| 7,794,192 B2 * | 9/2010 | Wright et al. | 414/22.65 |
| 7,967,540 B2 * | 6/2011 | Wright et al. | 414/22.55 |
| 8,109,087 B2 * | 2/2012 | Usoro et al. | 60/528 |
| 8,310,128 B2 * | 11/2012 | Ferreira et al. | 310/309 |

FOREIGN PATENT DOCUMENTS

| | | |
|---|---|---|
| JP | 2005-261167 | 9/2005 |
| JP | 2006-284392 | 10/2006 |
| JP | 2007-166714 | 6/2007 |
| WO | WO 2006/106949 A1 | 10/2006 |

OTHER PUBLICATIONS

International Written Opinion mailed May 18, 2010 in PCT/JP2010/051900 filed Feb. 9, 2010.

* cited by examiner

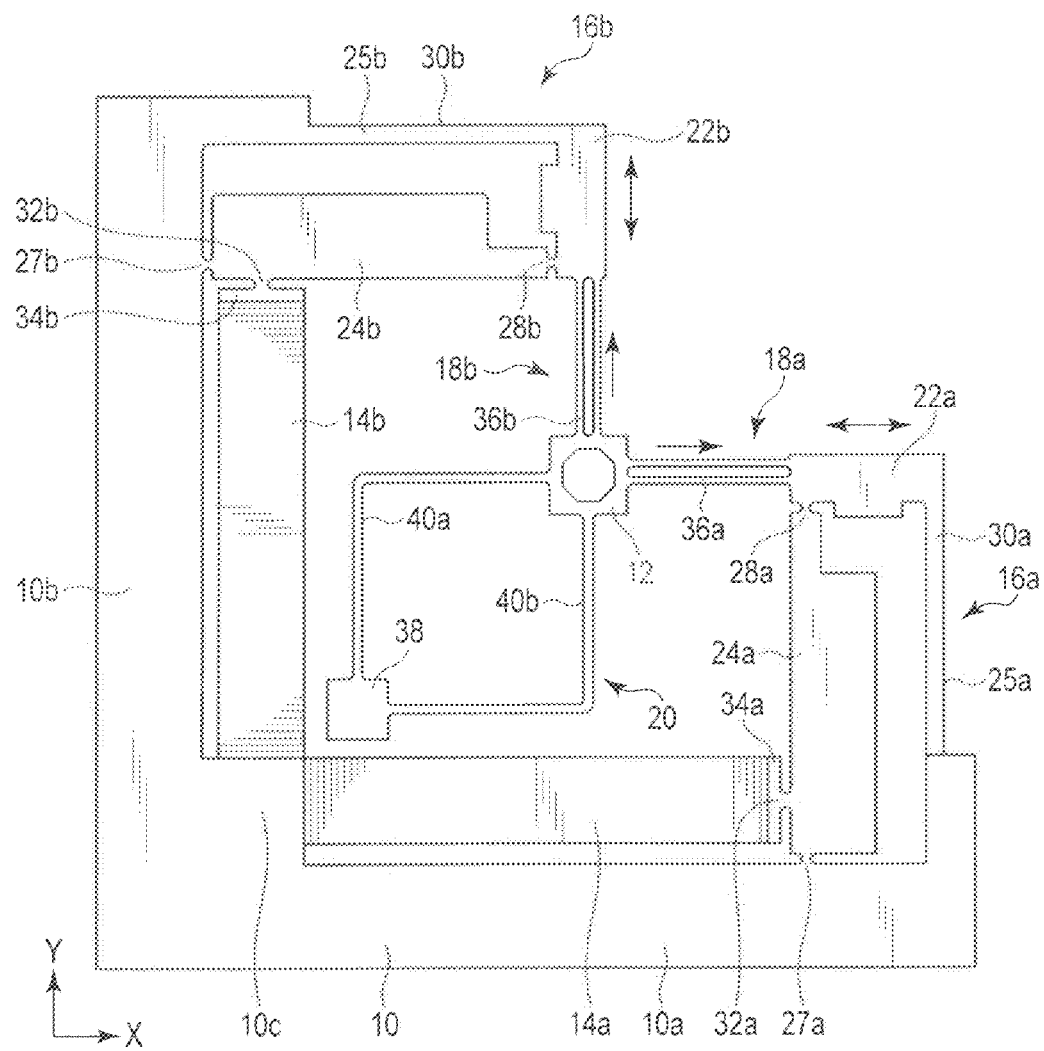
F I G. 1

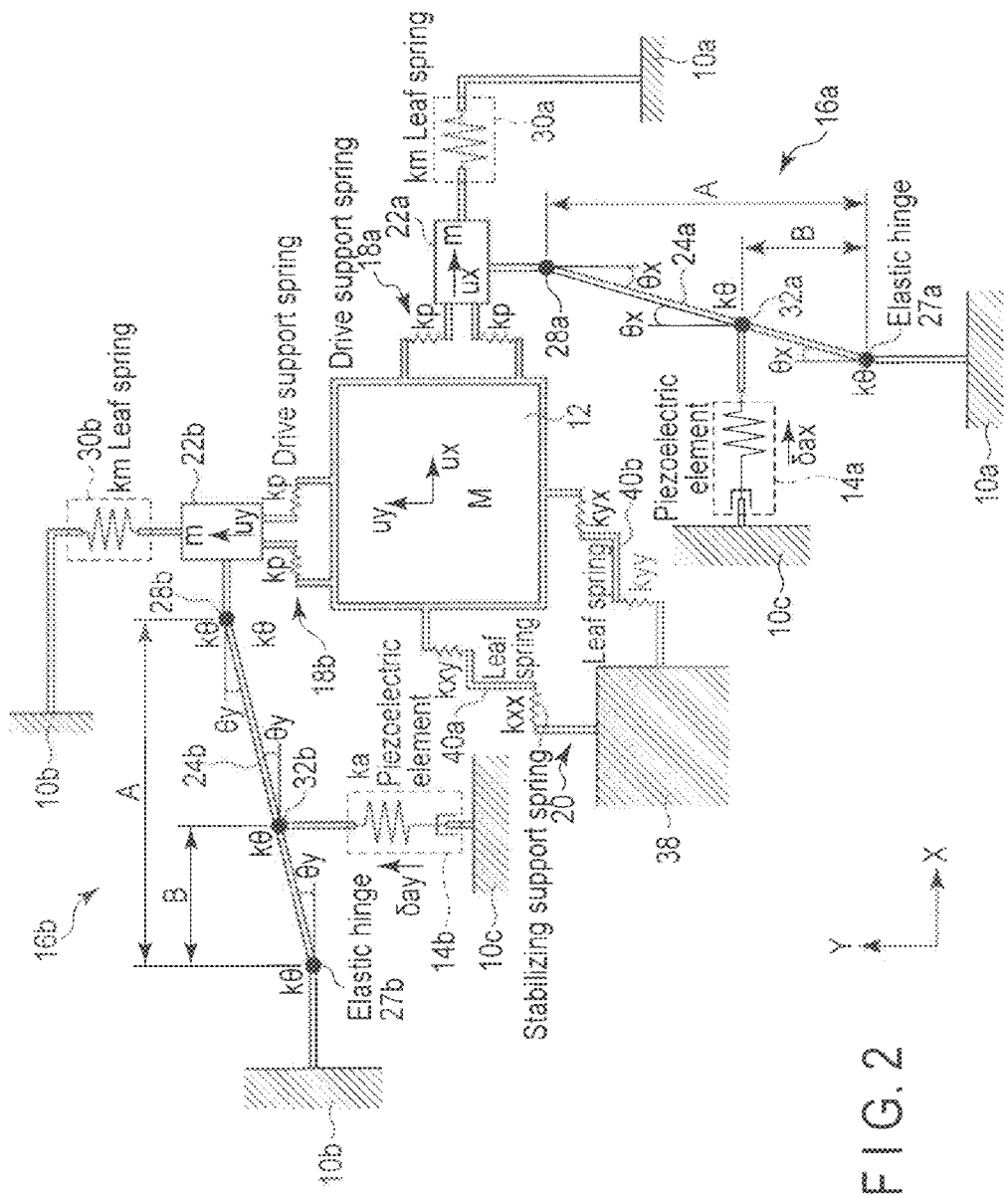
F I G. 2

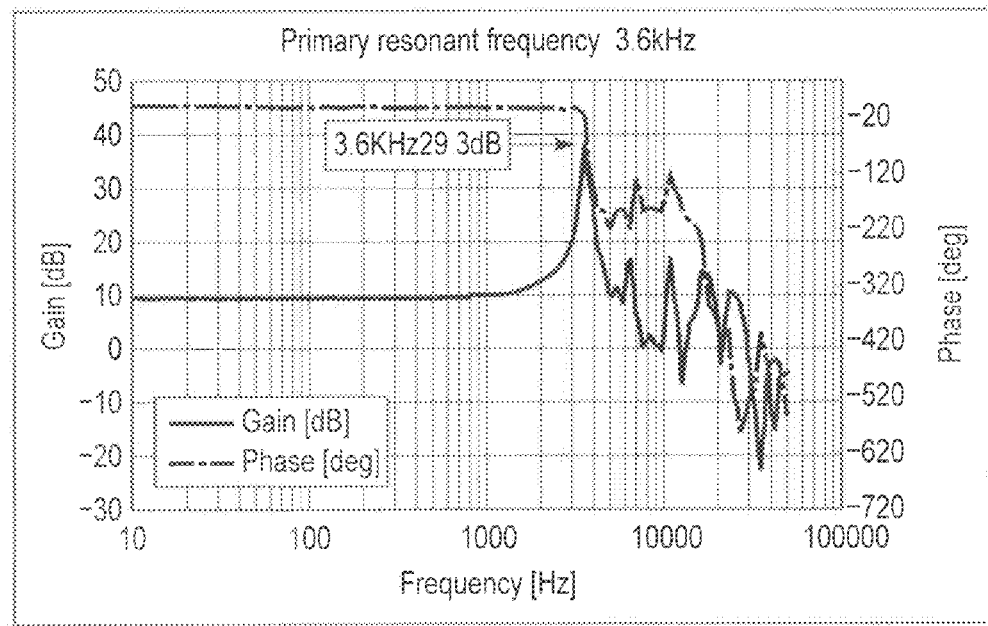
F I G. 5
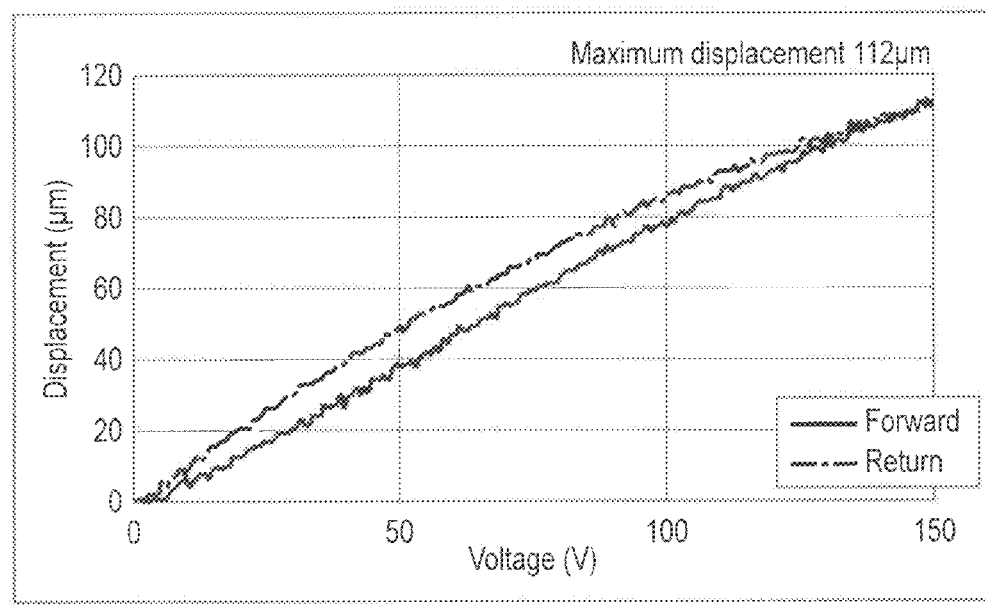
F I G. 6

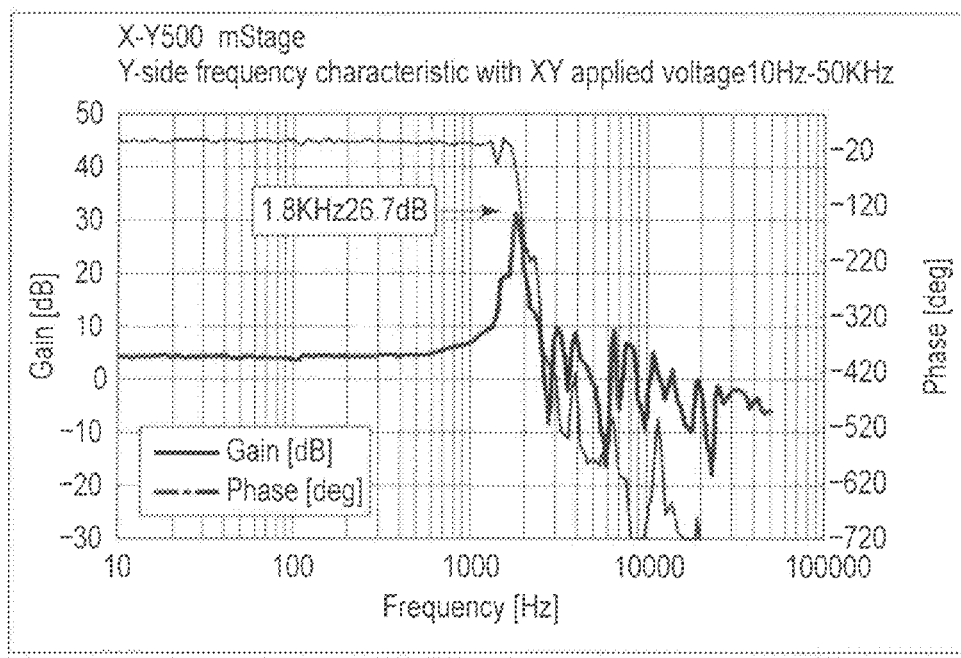
F I G. 10

PLANAR POSITIONING DEVICE AND INSPECTION DEVICE PROVIDED WITH THE SAME

CROSS-REFERENCE TO RELATED APPLICATIONS

This application is a Continuation Application of PCT application No. PCT/JP2010/051900, filed Feb. 9, 2010 and based upon and claiming the benefit of priority from prior Japanese Patent Application No. 2009-028029, filed Feb. 10, 2009, the entire contents of all of which are incorporated herein by reference.

BACKGROUND OF THE INVENTION

1. Field of the Invention

This invention relates to a planar positioning device in which a displacement magnifying device, comprising a displacement magnifying mechanism and an actuator for driving a stage, is located at right angles to an X-axis and Y-axis, and to a planar positioning device, having a high-precision resolution of sub-nanometer order in the same plane and configured to perform positioning control with quick response, and an inspection device provided with the same.

2. Description of the Related Art

Conventionally, precision scanning stages used in manufacturing and inspection processes for scanning probe microscopes, electron microscopes, semiconductors, and liquid crystals require performance for accurate scanning operation in an angular range of hundreds of micrometers with sub-nanometer positioning accuracy in a plane defined by orthogonal X- and Y-axes. Presently, in a scanning probe microscope, for example, a probe of silicon or the like is used to scan the surface of a sample. To this end, an XYZ-stage is put to practical use in nanometer-order observation. The XYZ-stage is obtained by combining a scanning stage that moves in a 100-μm-square XY-plane with a Z-axis stage for height adjustment of about 5 μm. In the existing state, however, it is technically very difficult to quickly scan the stage with sub-nanometer accuracy, and this scanning, especially if confined to the same plane, is not realized yet.

Even at this moment in time, an XY-stage, which is driven directly by stacked piezoelectric elements, can obtain nanometer-order positioning accuracy. It is very difficult, however, to steadily obtain nanometer-order positioning accuracy with high-speed scanning capability for an angular range of hundreds of micrometers or more.

One reason for this is that no-load extension of each stacked piezoelectric element is very small, adjusted to about $1/1,000$ of the natural length of laminated layers. In order to cover the operating range of hundreds of micrometers by means of the piezoelectric elements themselves, two piezoelectric elements having a lamination thickness of hundreds of millimeters must be arranged at right angles to each other, even if the portable mass load is small. Actually, however, it is impossible to transmit elongations of the stacked piezoelectric elements as long as hundreds of millimeters directly to the XY-stage, on the basis of practical use.

To overcome this, various scanning stages are proposed that comprise a displacement magnifying mechanism configured to magnify displacement (or extension) of stacked piezoelectric elements. In general, however, a mechanism for magnifying displacement reduces the rigidity of the stage as the displacement amount increases, possibly resulting in a reduction in the resonant frequency of the stage itself that influences the control performance.

The displacement magnifying mechanism comprises actuators arranged on an X-axis and Y-axis, individually. The displacement magnifying mechanism produces such actions as a rotary action (rotary action around a θ-axis) that cannot be controlled by means of the actuators, as well as accurate actions parallel to the X-axis and Y-axis by the actuators. Thus, the displacement magnifying mechanism hinders accurate nanometer-level positioning.

On the other hand, there is proposed a technique for magnifying displacement of stacked piezoelectric elements without reducing the rigidity of a stage (e.g., Jpn. Pat. Appln. KOKAI Publication No. 2005-261167 (Japanese Patent No. 3612670) and Jpn. Pat. Appln. KOKAI Publication No. 2007-166714).

According to a device disclosed in Jpn. Pat. Appln. KOKAI Publication No. 2005-261167, an actuator amplifies a displacement produced by the stacked piezoelectric elements while maintaining high rigidity and outputs an accurate linear motion as a displacement of a mover. Further, a restraining member is located between a link portion and the mover with a viscoelastic material therebetween. A high-peak amplitude that is produced at a resonant frequency by the actuator is efficiently attenuated and reduced by the restraining member, whereby the control performance of the actuator is improved.

An actuator proposed in Jpn. Pat. Appln. KOKAI Publication No. 2007-166714 comprises a displacement magnifying mechanism that increases a magnified displacement amount while maintaining a high resonant frequency. This displacement magnifying mechanism comprises a supporting portion and a pair of parallel links. The supporting portion is opposed to a movable portion with a gap therebetween. The parallel links individually connect the supporting portion and movable portion and is configured to be elastically deformed as a piezoelectric element is displaced. The piezoelectric element is mounted on one of the parallel links. The other of the parallel links is formed of a leaf spring. The displacement of the piezoelectric element is magnified by a parallel link that comprises a lever structure, elastic hinge, and beam, and transferred to outside the parallel link.

In transmitting an elongation of a stacked piezoelectric element directly to a stage used in a scanning probe microscope or the like, for example, accurate positioning operation can be achieved in a plane defined by an X-axis and Y-axis by the elongation of the stacked piezoelectric element within a small displacement region. In a large operating region, however, actions along the X-axis and Y-axis interfere with each other, that is, one of the axes applies a moment to the other, whereupon rotation around the θ-axis is produced along with their respective translational motions. Thus, bending moment is also produced as stress in the stacked piezoelectric element itself, thereby causing translational motions that are accompanied by rotation around a Z-axis (θ-axis) perpendicular to an XY-plane. Since the stage has neither a function to suppress or correct the action around the Z-axis nor necessary design flexibility for compensation, accurate positioning in the XY-plane is impeded, so that the scanning operation itself cannot be easily controlled.

If the stage that combines two orthogonal actuators with the displacement magnifying mechanism described in Patent Document 2 is used for scanning in the XY-plane, the respective motions of the actuators are restricted unless an appropriate support structure is provided for the stage. Accordingly, the stage is caused to rotate around the Z-axis by interference between the X-axis and Y-axis. Thus, it is difficult to construct a mechanism for quick and precise positioning in the same XY-plane.

BRIEF SUMMARY OF THE INVENTION

According to an aspect of the invention, a planar positioning device comprises:
a first actuator displaceable in a direction of a first axis;
a second actuator displaceable in a direction of a second axis perpendicular to the first axis;
a first displacement magnifying mechanism configured to magnify a displacement of the first actuator in the first-axis direction;
a second displacement magnifying mechanism configured to magnify a displacement of the second actuator in the second-axis direction;
a stage arranged in a plane parallel to the first axis and the second axis;
a first drive support mechanism comprising a parallel link connected between the first displacement magnifying mechanism and the stage to extend in the first-axis direction, supporting the stage in the plane, and configured to transmit the displacement in the first-axis direction, magnified by the first displacement magnifying mechanism, to the stage;
a second drive support mechanism comprising a parallel link connected between the second displacement magnifying mechanism and the stage to extend in the second-axis direction, supporting the stage in the plane, and configured to transmit the displacement in the second-axis direction, magnified by the second displacement magnifying mechanism, to the stage; and
a stabilizing support mechanism supporting the stage and configured to apply tensions in the first-axis direction and the second-axis direction to the stage.

According to another aspect of the invention, a planar positioning device comprises:
a stage movable in a plane having a direction of a first axis and a direction of a second axis perpendicular the first axis;
a first actuator configured to produce a displacement in the first-axis direction;
a second actuator configured to produce a displacement in the second-axis direction;
a first drive support mechanism comprising a parallel link connected between the first actuator and the stage to extend in the first-axis direction, supporting the stage, and configured to transmit the displacement of the first actuator in the first-axis direction to the stage;
a second drive support mechanism comprising a parallel link connected between the second actuator and the stage to extend in the second-axis direction, supporting the stage, and configured to transmit the displacement of the second actuator in the second-axis direction to the stage; and
a stabilizing support mechanism connected to the stage, supporting the stage, and configured to apply tensions in the first-axis direction and the second-axis direction to the stage.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a plan view showing a planar positioning device according to a first embodiment of this invention;
FIG. 2 is a diagram schematically showing a simplified model of the planar positioning device;
FIG. 5 is a diagram showing the resonant frequency of the planar positioning device;
FIG. 6 is a diagram showing the displacement of the planar positioning device;
FIG. 10 is a diagram showing the resonant frequency of the planar positioning device.

DETAILED DESCRIPTION OF THE INVENTION

Figure 3:
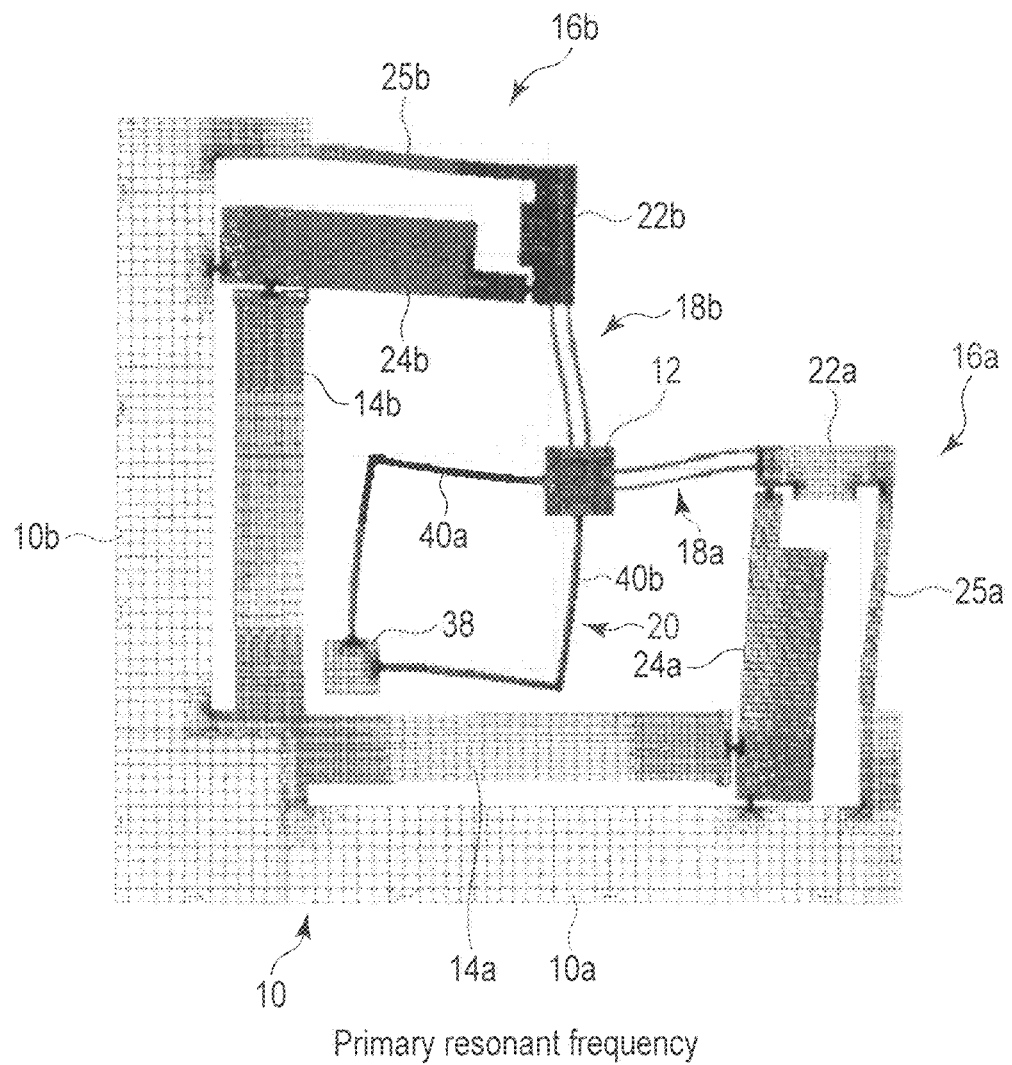
FIG. 3 is a diagram showing the result of a resonant frequency analysis based on the finite element method for the planar positioning device.

A planar positioning device according to a first embodiment of this invention will now be described in detail with reference to the drawings.

FIG. 1 is a plan view showing the planar positioning device, and FIG. 2 is a diagram schematically showing a simplified model of the planar positioning device. As seen from these drawings, the planar positioning device comprises a substantially L-shaped support base 10, stage 12, first piezoelectric element 14a (e.g., stacked), second piezoelectric element 14b (e.g., stacked), first displacement magnifying mechanism 16a, second displacement magnifying mechanism 16b, first drive support mechanism 18a, second drive support mechanism 18b, and stabilizing support mechanism 20. The support base 10 functions as a supporting member. The stage 12 is an object of positioning, which is movable in an XY-plane. The first piezoelectric element 14a functions as a first actuator that produces a displacement along an X-axis. The second piezoelectric element 14b functions as a second actuator that produces a displacement along a Y-axis perpendicular to the X-axis. The first displacement magnifying mechanism 16a serves to magnify the displacement of the first piezoelectric element 14a. The second displacement magnifying mechanism 16b serves to magnify the displacement of the second piezoelectric element. The first drive support mechanism 18a connects the stage 12 and first displacement magnifying mechanism 16a and transmits the displacement magnified by the first displacement magnifying mechanism to the stage 12. The second drive support mechanism 18b connects the stage 12 and second displacement magnifying mechanism 16b and transmits the displacement magnified by the second displacement magnifying mechanism to the stage. The stabilizing support mechanism 20 applies tension in the drive direction to the stage 12, thereby stabilizing the support of the stage. Further, the planar positioning device comprises a driver circuit (not shown), which applies voltage to the first piezoelectric element 14a and second piezoelectric element 14b.

As shown in FIG. 1, the support base 10 integrally comprises a first supporting portion 10a and second supporting portion 10b, each in the form of a prism. The first supporting portion 10a extends along the X-axis (first axis). The second supporting portion 10b extends at right angles to the first supporting portion 10a, that is, along the Y-axis (second axis). A rectangular pedestal portion 10c is integrally formed at an inner corner portion of the support base 10.

The first displacement magnifying mechanism 16a comprises a prism-like movable portion (displacement magnifying portion) 22a and a pair of link portions 24a and 25a. The movable portion 22a is opposed substantially parallel to a longitudinal end portion of the first supporting portion 10a with a gap therebetween. The link portions 24a and 25a extend parallel to each other between the first supporting portion 10a and movable portion 22a. The movable portion 22a extends along the X-axis and is located at a gap along the Y-axis from the first supporting portion 10a. The pair of link portions 24a and 25a extend parallel to each other along the Y-axis.

The link portion 24a is in the form of a prism, the longitudinally opposite ends of which are connected to the first supporting portion 10a and movable portion 22a by elastic hinges 27a and 28a, individually. The hinges 27a and 28a are formed by slitting the opposite ends, thereby reducing their respective widths. The link portion 24a is in the form of a stepped pillar, which is made narrower on the side of the movable portion 22a. The link portion 24a extends in the direction (Y-axis direction) perpendicular to the moving direction (X-axis direction) of the movable portion 22a.

The other link portion 25a is formed of a leaf spring 30a. The link portion 25a extends along the Y-axis and its longitudinally opposite ends are connected to the first supporting portion 10 and movable portion 22a, individually.

The link portions 24a and 25a constitute a parallel link. The movable portion 22a can perform equivalent linear motions around the elastic hinges 27a and 28a and leaf spring 30a, based on elastic deformations of the elastic hinges 27a and 28a and elastic deformation (deflection) of the leaf spring 30a. Thus, the movable portion 22a is supported for movement relative to the first supporting portion 10a along the X-axis.

The first piezoelectric element 14a is substantially in the form of a prism as a whole and is displaceable along its operation axis. The first piezoelectric element 14a is mounted on the first supporting portion 10a outside the first displacement magnifying mechanism 16a. One end of the first piezoelectric element 14a is secured to the pedestal portion 10c of the support base 10. The other end of the first piezoelectric element 14a is connected to the proximal end portion of the link portion 24a by a lever mechanism 34a comprising an elastic hinge 32a. Thus, the first piezoelectric element 14a is located between the first supporting portion 10a and first displacement magnifying mechanism 16a in such a manner that its operation axis extends along the X-axis, that is, it extends parallel to the moving direction of the movable portion 22a.

The first supporting portion 10a of the support base 10, movable portion 22a of the first displacement magnifying mechanism 16a, link portions 24a and 25a, elastic hinges 27a, 28a and 32a, and lever mechanism 34a consist mainly of a highly stiff metallic material, such as titanium alloy steel, duralumin (high-strength aluminum), stainless steel, or electrically conductive ceramics. The movable portion 22a, link portions 24a and 25a, elastic hinges 27a, 28a and 32a, and lever mechanism 34a function as movable mechanisms of the first displacement magnifying mechanism 16a.

If the longitudinal dimension of the link portion 24a between the respective centers of the elastic hinges 27a and 28a and the distance between the respective centers of the elastic hinge 32a of the lever mechanism 34a and the elastic hinge 27a on the side of the first supporting portion 10a are A and B, respectively, in the first displacement magnifying mechanism 16a constructed in this manner, a small displacement of the first piezoelectric element 14a along the X-axis is magnified at a lever ratio of A/B at the movable portion 22a.

As shown in FIGS. 1 and 2, the second displacement magnifying mechanism 16b is constructed substantially symmetrically with the first displacement magnifying mechanism 16a. The second displacement magnifying mechanism 16b comprises a prism-like movable portion (displacement magnifying portion) 22b and a pair of link portions 24b and 25b. The movable portion 22b is opposed substantially parallel to a longitudinal end portion of the second supporting portion 10b with a gap therebetween. The link portions 24b and 25b extend parallel to each other between the second supporting portion 10b and movable portion 22b. The movable portion 22b extends along the Y-axis and is located at a gap along the X-axis from the second supporting portion 10b. The pair of link portions 24b and 25b extend parallel to each other along the X-axis.

The link portion 24b is in the form of a prism, the longitudinally opposite ends of which are connected to the second supporting portion 10b and movable portion 22b by elastic hinges 27b and 28b, individually. The elastic hinges 27b and 28b are formed by slitting the opposite ends, thereby reducing their respective widths. The link portion 24b is in the form of a stepped pillar, which is made narrower on the side of the movable portion 22b. The link portion 24b extends in the direction (X-axis direction) perpendicular to the moving direction (Y-axis direction) of the movable portion 22b.

The other link portion 25b is formed of a leaf spring 30b. The link portion 25b extends along the X-axis and its longitudinally opposite ends are connected to the second supporting portion 10b and movable portion 22b, individually.

The link portions 24b and 25b constitute a parallel link. The movable portion 22b can perform equivalent linear motions around the elastic hinges 27b and 28b and leaf spring 30b, based on elastic deformations of the elastic hinges and elastic deformation (deflection) of the leaf spring. Thus, the movable portion 22b is supported for movement relative to the second supporting portion 10b along the Y-axis.

The second piezoelectric element 14b is substantially in the form of a prism as a whole and is displaceable along its operation axis. The second piezoelectric element 14b is mounted on the second supporting portion 10b outside the second displacement magnifying mechanism 16b. One end of the second piezoelectric element 14b is secured to the pedestal portion 10c of the support base 10. The other end of the second piezoelectric element 14b is connected to the proximal end portion of the link portion 24b by a lever mechanism 34b comprising an elastic hinge 32b. Thus, the second piezoelectric element 14b is located between the second supporting portion 10b and second displacement magnifying mechanism 16b in such a manner that its operation axis extends along the Y-axis, that is, it extends parallel to the moving direction of the movable portion 22b.

The second supporting portion 10b of the support base 10, movable portion 22b of the second displacement magnifying mechanism 16b, link portions 24b and 25b, elastic hinges 27b, 28b and 32b, and lever mechanism 34b consist mainly of a highly stiff metallic material, such as titanium alloy steel, duralumin (high-strength aluminum), stainless steel, or electrically conductive ceramics. The movable portion 22b, link portions 24b and 25b, elastic hinges 27b, 28b and 32b, and lever mechanism 34b function as movable mechanisms of the second displacement magnifying mechanism 16b.

If the longitudinal dimension of the link portion 24b between the respective centers of the elastic hinges 25b and 25b and the distance between the respective centers of the elastic hinge 32b of the lever mechanism 34b and the elastic hinge 27b on the side of the second supporting portion 10b are A and B, respectively, in the second displacement magnifying mechanism 16b constructed in this manner, a small displacement of the second piezoelectric element 14b along the Y-axis is magnified at a lever ratio of A/B at the movable portion 22b.

As shown in FIGS. 1 and 2, the stage 12 is located between the first displacement magnifying mechanism 16a and second displacement magnifying mechanism 16b in the XY-plane. The stage 12 is disposed in a position where the moving direction X of the movable portion 22a of the first displacement magnifying mechanism 16a and the moving direction Y of the movable portion 22b of the second displacement magnifying mechanism 16b cross each other.

The stage 12 is connected to the movable portion 22a of the first displacement magnifying mechanism 16a by the first drive support mechanism 18a, and to the movable portion 22b of the second displacement magnifying mechanism 16b by the second drive support mechanism 18b. The stage 12 is supported for movement in the XY-plane by the first and second drive support mechanisms 18a and 18b.

The first drive support mechanism 18a comprises a parallel link 36a that functions as a drive support spring. The parallel link 36a is formed of, for example, a pair of parallel leaf springs. The pair of leaf springs individually extend along the X-axis or in the moving direction of the movable portion 22a and face each other with a gap therebetween along the Y-axis. One longitudinal end of the parallel link 36a is connected to the movable portion 22a of the first displacement magnifying mechanism 16a, and the other end to the stage 12. The parallel link 36a is highly rigid along the X-axis and a Z-axis, which extends at right angles to the XY-plane defined by the X- and Y-axes, and is flexible along the Y-axis perpendicular to the X-axis. Thus, the parallel link 36a keeps the stage 12 parallel, thereby avoiding rotation of the stage, and transmits the displacement of the movable portion 22a to the stage 12, thereby moving the stage 12 along the X-axis.

The parallel link 36a is not limited to the structure comprising the pair of parallel leaf springs, and it may alternatively be a parallel link that comprises elastic hinges formed by cutting both ends of a beam and other members.

The second drive support mechanism 18b comprises a parallel link 36b that functions as a drive support spring. The parallel link 36b is formed of, for example, a pair of parallel leaf springs. The pair of leaf springs individually extend along the Y-axis or in the moving direction of the movable portion 22b and face each other with a gap therebetween along the X-axis. One longitudinal end of the parallel link 36b is connected to the movable portion 22b of the second displacement magnifying mechanism 16b, and the other end to the stage 12. The parallel link 36b is highly rigid along the Y-axis and Z-axis and is flexible along the X-axis perpendicular to the Y-axis. Thus, the parallel link 36b transmits the displacement of the movable portion 22b to the stage 12, thereby moving the stage 12 along the Y-axis.

The parallel link 36b is not limited to the structure comprising the pair of parallel leaf springs, and it may alternatively be a parallel link that comprises elastic hinges formed by cutting both ends of a beam and other members.

As shown in FIGS. 1 and 2, the stabilizing support mechanism 20 comprises a spring fixing portion 38, which is spaced apart from the stage 12 along the X-axis and Y-axis and fixedly disposed on the side opposite to the first and second drive support mechanisms 18a and 18b, and first and second stabilizing support springs 40a and 40b that connect the spring fixing portion and the stage 12.

The first and second stabilizing support springs 40a and 40b are formed of leaf springs, metal wires, or coil springs. The first stabilizing support spring 40a extends along the Y-axis and then the X-axis from the spring fixing portion 38 and is connected to the stage 12 on the side opposite to the parallel link 36a. The first stabilizing support spring 40a is elastic along the X-axis and Y-axis and highly rigid along the Z-axis. The second stabilizing support spring 40b extends along the X-axis and then the Y-axis from the spring fixing portion 38 and is connected to the stage 12 on the side opposite to the parallel link 36b. The second stabilizing support spring 40b is elastic along the X-axis and Y-axis and highly rigid along the Z-axis. The first and second stabilizing support springs 40a and 40b are substantially symmetric with respect to a line that passes through the stage 12 and spring fixing portion 38. In the present embodiment, both the first and second stabilizing support springs 40a and 40b are formed substantially in the shape of a rectangular frame. These first and second stabilizing support springs 40a and 40b constantly maintain tension and apply pulling tension to the stage 12 and parallel links 36a and 36b. In this way, the stabilizing support mechanism 20 suppresses a displacement of the stage 12 along the Z-axis and compressive displacements of the parallel links 36a and 36b, thereby stably supporting the stage 12 in the XY-plane.

The stabilizing support springs 40a and 40b are not limited to the substantially right-angled shape described above and may alternatively be of, for example, an arcuate shape. In short, they should only be shaped so that they can apply tension along the X-axis and Y-axis.

The following is a description of the operation of the planar positioning device constructed in this manner. FIG. 1 shows a state in which the stage 12 of the planar positioning device is in an initial position or reference position. In moving the stage 12 to and locating it in a desired position, voltage is applied to, for example, the first piezoelectric element 14a, thereby causing it to make a small displacement (or extension) along the X-axis. Thereupon, this small displacement is increased to a displacement of the movable portion 22a along the X-axis by the first displacement magnifying mechanism 16a. The displacement of the movable portion 22a is transmitted to the stage 12 by the parallel link 36a of the first drive support mechanism 18a, whereupon the stage 12 moves relative to the support base 10 along the X-axis in the XY-plane. If voltage is applied to the second piezoelectric element 14b, thereby causing it to make a small displacement (or extension) along the Y-axis, moreover, this small displacement is increased to a displacement of the movable portion 22b along the Y-axis by the second displacement magnifying mechanism 16b. The displacement of the movable portion 22b is transmitted to the stage 12 by the parallel link 36b of the second drive support mechanism 18b, whereupon the stage 12 moves relative to the support base 10 along the Y-axis in the XY-plane. As this is done, the stabilizing support mechanism 20 constantly applies tension in the drive direction to displace the stage 12 and applies pulling tension to the stage 12 and parallel links 36a and 36b. In this way, the stabilizing support mechanism 20 suppresses a displacement of the stage 12 along the Z-axis and compressive displacements of the parallel links 36a and 36b, thereby stably supporting the stage 12 in the XY-plane.

In evaluating the performance of the displacement magnifying mechanisms of the planar positioning device, the simplified model shown in FIG. 2 may be contrived. In FIG. 2, the displacement magnification factors of the displacement magnifying mechanisms are determined based on length A of the link portions 24a and 24b and length B from the elastic hinges 27a and 28a to the elastic hinge 32a and 32b, which serve as pivots of the piezoelectric elements. The small displacements of the first and second piezoelectric elements 14a and 14b are magnified to A/B displacement amounts along both the X-axis and Y-axis at the movable portions 22a and 22b of the first and second displacement magnifying mechanism 16a and 16.

In the modeled planar positioning device shown in FIG. 2, variables and constants are given as follows:

ka: spring constant of the first and second piezoelectric elements 14a and 14b,

δax, δay: no-load elongations of the first and second piezoelectric elements 14a and 14b, kθ: rotational spring constant of the elastic hinges 27a, 27b, 28a, 28b, 32a and 32b, km: spring constant of the leaf springs 30a and 30b of the first and second displacement magnifying mechanisms, kp: spring constant of the drive support spring (parallel leaf spring), kxx, kxy: spring constants of the X-direction stabilizing support spring 40a for the X-direction and Y-direction, kyy, kyx: spring constants of the Y-direction stabilizing support spring 40b for the Y-direction and X-direction (kxy=kyx, kxx=kyy for symmetric structure), θx: tilt angle of the link portion 24a relative to the Y-axis,
θy: tilt angle of the link portion 24b relative to the X-axis,
M: mass of the stage 12,
m: mass of the movable portions 22a and 22b,
ux: magnified displacement amount along the X-axis, and
uy: magnified displacement amount along the Y-axis.

If the model thus simplified is analyzed, the magnified displacement amount ux along the X-axis, magnified displacement amount uy along the Y-axis, X-direction resonant frequency fx, and Y-direction resonant frequency fy can be derived as follows:

$$u_x = \left(\frac{A}{B}\right)\left(\frac{k_a}{k_{apx}}\right)\delta_{ax} \tag{1}$$

$$u_y = \left(\frac{A}{B}\right)\left(\frac{k_a}{k_{apy}}\right)\delta_{ay} \tag{2}$$

$$f_x = \frac{1}{2\pi}\left(\frac{B}{A}\right)\sqrt{\frac{k_{apx}}{M+m}} \tag{3}$$

$$f_y = \frac{1}{2\pi}\left(\frac{B}{A}\right)\sqrt{\frac{k_{apy}}{M+m}} \tag{4}$$

$$k_{apx} = \left(\frac{A}{B}\right)^2(k_m + k_{xx} + k_{yx} + 2k_p) + 3\left(\frac{1}{B}\right)^2 k_\theta + k_a \tag{5}$$

$$k_{apy} = \left(\frac{A}{B}\right)^2(k_m + k_{yy} + k_{xy} + 2k_p) + 3\left(\frac{1}{B}\right)^2 k_\theta + k_a \tag{6}$$

Here kapx and kapy are equivalent to the spring constants of the entire planar positioning device for the X-direction and Y-direction.

In order to increase the magnified displacement amounts ux and uy of the first and second displacement magnifying mechanisms, it is necessary to increase the magnification factor (lever ratio, A/B) according to equations (1) and (2), select piezoelectric elements with the high spring constant ka and elongations δax and δay, or reduce the spring constants kapx and kapy of the entire device.

In order to increase the resonant frequencies fx and fy, on the other hand, it is evidently necessary only to reduce the masses M and m of the moving parts, increase the spring constants kapx and kapy of the entire device, and further reduce the magnification factor (A/B).

In the planar positioning device according to the present embodiment, the large magnified displacement amounts ux and uy are obtained by increasing the spring constants kapx and kapy of the entire device and reducing the masses M and m of the moving parts, thereby maintaining the high resonant frequencies fx and fy, and selecting piezoelectric elements with the high spring constant ka and elongations δax and δay.

FIG. 3 shows the result of a primary resonant frequency mode for a resonant frequency analysis based on the finite element method (FEM analysis) performed for the performance evaluation of a planar positioning device (100 μm) designed for a maximum stage displacement amount of 100 μm. This result indicates that this planar positioning device can obtain a very high resonant frequency based on a primary resonant frequency of 3.18 kHz.

Figure 4:
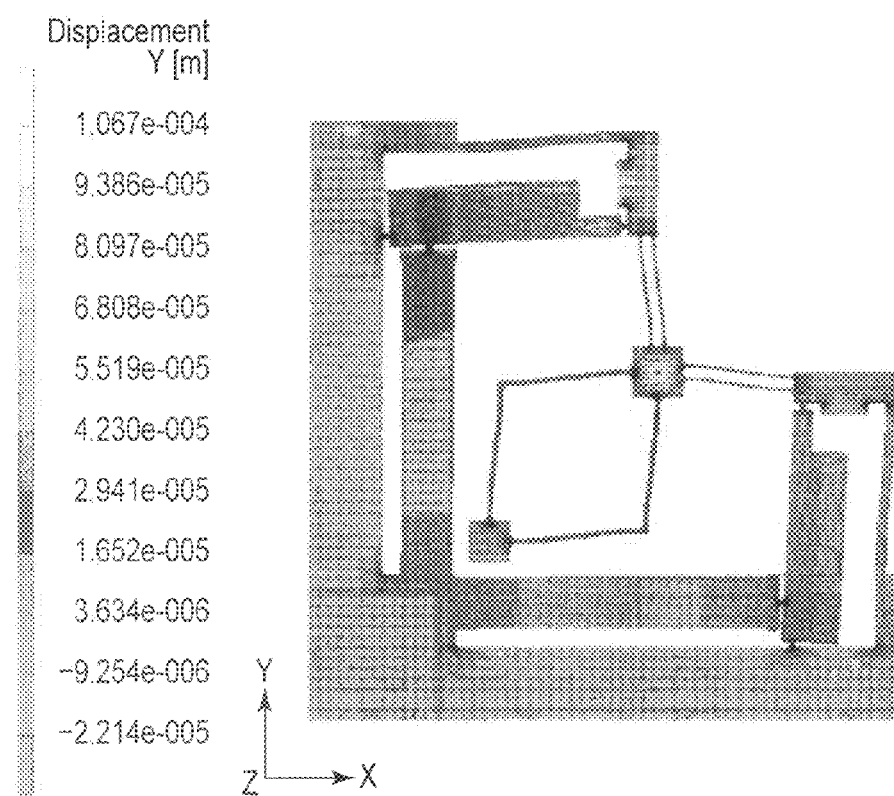
FIG. 4 is a diagram showing the result of a finite element method analysis of the displacement of the planar positioning device.

FIG. 4 shows the result of a finite element method analysis (FEM analysis) of the maximum static displacement of the planar positioning device (100 μm) designed for the maximum stage displacement amount of 100 μm performed for the performance evaluation of the planar positioning device. This result indicates that the magnified displacement amounts uy and ux obtained when voltage of 150 V is applied to the first and second piezoelectric elements are 106 μm (simulation).

The planar positioning device (100 μm) of the above configuration was experimentally manufactured and its resonant frequency and maximum displacement amount were actually measured. When voltage of 150 V was applied to the first and second piezoelectric elements, the primary resonant frequency was 3.6 kHz, as shown in FIG. 5. As shown in FIG. 6, moreover, the maximum displacement amount was 112 μm, and the performance obtained by the FEM analysis was able to be actually obtained.

According to the planar positioning device constructed in this manner, large stage displacement amounts can be obtained by increasing small displacements of the actuators by means of the displacement magnifying mechanisms and transmitting them to the stage. The first and second drive support mechanisms, formed of the parallel links, can be configured to be able to flexibly support the stage along the Y-axis or X-axis perpendicular to the direction of pull despite their high rigidity in the pulling direction. Thus, the stage can be kept parallel as it is prevented from rotating around the Z-axis. If a displacement along the X-axis is caused by the first piezoelectric element, for example, the stage is not liable to be affected by the operation of the second drive support mechanism that suppress the movement of the stage along the Y-axis, so that a large displacement of the stage can be obtained.

Since the stage is supported by the first and second drive support mechanisms and stabilizing support mechanism, moreover, it can be stably supported parallel in the XY-plane. If the stage is flexibly held by means of the first and second drive support mechanisms, the motion of the stage makes the parallel links of the drive support mechanisms unstable against compression. However, the stage can be positioned stably, quickly, and precisely by constantly applying tension to the stage, thereby applying tensile force to the stage and parallel links, by means of the stabilizing support mechanism. The stage is flexibly supported by the drive support mechanism and stabilizing support mechanism with respect to directions other than the drive direction and Z-axis direction. Therefore, the stage with high mechanical rigidity can be accurately positioned with precision of sub-nanometer order while securing a stroke with a maximum displacement of hundreds of microns.

Thus, there may be obtained a planar positioning device in which the magnified displacement amount can be increased and positioning can be achieved quickly and precisely while maintaining a high resonant frequency. Further, the selection and design flexibility of the actuator structure can be achieved independently. Even if an actuator with a large displacement amount is used, therefore, dimensional restrictions by the actuator can be avoided, so that a planar positioning device with a large operation area can be obtained.

Furthermore, the present planar positioning device can provide a high resonant frequency and substantial displacement magnification and achieve higher performance of a movement mechanism for a scanning probe microscope or semiconductor inspection device and control performance that can easily cope with compensation of temperature drift and disturbance.

The following is a description of a planar positioning device according to a second embodiment of this invention.

Figure 7:
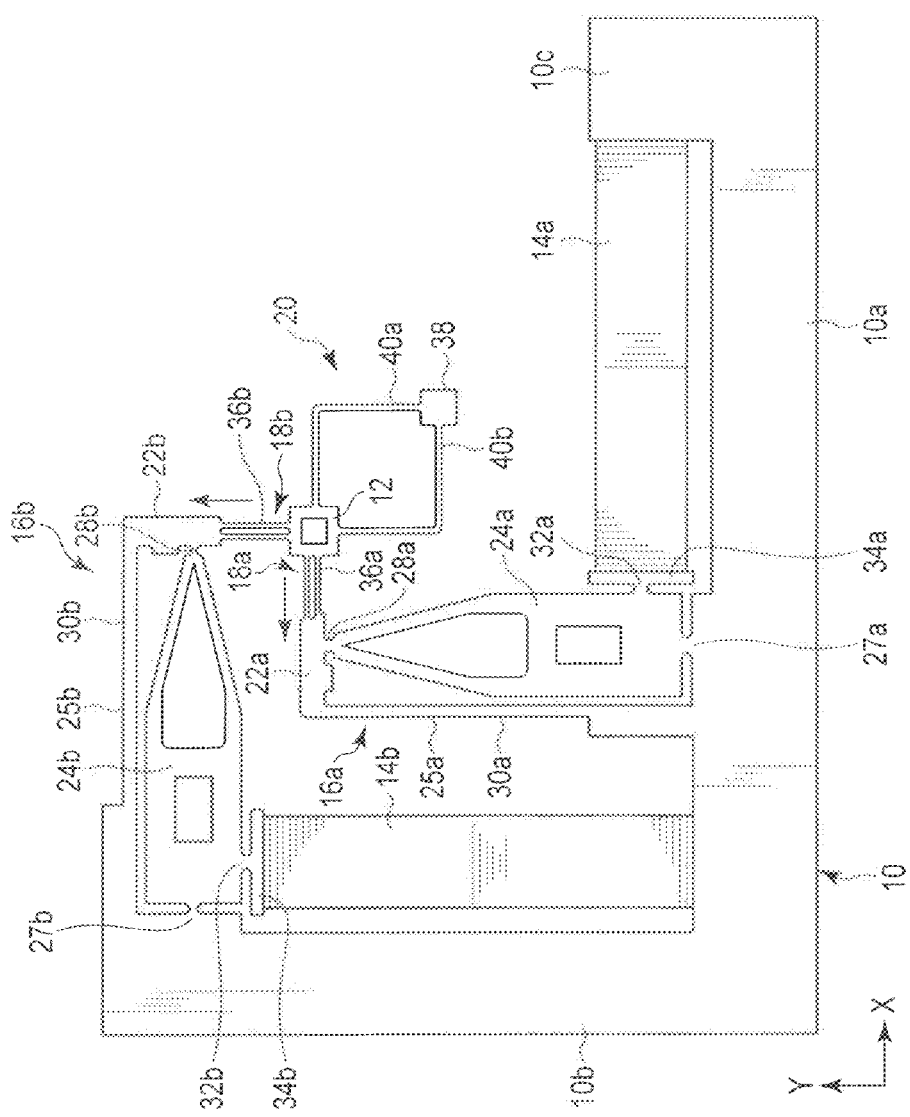
FIG. 7 is a plan view showing a planar positioning device according to a second embodiment of this invention.

FIG. 7 is a plan view showing the planar positioning device according to the second embodiment. As shown in FIG. 7, the planar positioning device comprises a substantially L-shaped support base 10, stage 12, first staked piezoelectric element 14a, second stacked piezoelectric element 14b, first displacement magnifying mechanism 16a, second displacement magnifying mechanism 16b, first drive support mechanism 18a, second drive support mechanism 18b, and stabilizing support mechanism 20. The support base 10 functions as a fixed member. The stage 12 is an object of positioning, which is movable in an XY-plane. The first piezoelectric element 14a functions as a first actuator that produces a displacement along an X-axis. The second piezoelectric element 14b functions as a second actuator that produces a displacement along a Y-axis perpendicular to the X-axis. The first displacement magnifying mechanism 16a serves to magnify the displacement of the first piezoelectric element 14a. The second displacement magnifying mechanism 16b serves to magnify the displacement of the second piezoelectric element. The first drive support mechanism 18a connects the stage 12 and first displacement magnifying mechanism 16a and transmits the displacement magnified by the first displacement magnifying mechanism to the stage 12. The second drive support mechanism 18b connects the stage 12 and second displacement magnifying mechanism 16b and transmits the displacement magnified by the second displacement magnifying mechanism to the stage. The stabilizing support mechanism 20 applies tension in the drive direction to the stage 12, thereby stabilizing the support of the stage.

As shown in FIG. 7, the support base 10 integrally comprises a first supporting portion 10a and second supporting portion 10b, each in the form of a prism. The first supporting portion 10a extends along the X-axis (first direction). The second supporting portion 10b extends at right angles to the first supporting portion 10a, that is, along the Y-axis (second direction). A rectangular pedestal portion 10c projecting in the Y-direction is integrally formed on an extended end portion of the first supporting portion 10.

The first displacement magnifying mechanism 16a is disposed at a longitudinally intermediate portion of the first supporting portion 10a. Specifically, the first displacement magnifying mechanism 16a comprises a prism-like movable portion (displacement magnifying portion) 22a and a pair of link portions 24a and 25a. The movable portion 22a is opposed substantially parallel to the longitudinally intermediate portion of the first supporting portion 10a with a gap therebetween. The link portions 24a and 25a extend parallel to each other between the first supporting portion 10a and movable portion 22a. The movable portion 22a extends along the X-axis and is located at a gap along the Y-axis from the first supporting portion 10a. The pair of link portions 24a and 25a extend parallel to each other along the Y-axis.

The link portion 24a is in the form of a prism, the longitudinally opposite ends of which are connected to the first supporting portion 10a and movable portion 22a by elastic hinges 27a and 28a, individually. The hinges 27a and 28a are formed by slitting the opposite ends, thereby reducing their respective widths. About half the link portion 24a on the side of the movable portion 22a is tapered, and an opening is formed in this portion, thus forming a leaf spring structure connected by the elastic hinge 28a. The link portion 24a extends in the direction (Y-axis direction) perpendicular to the moving direction (X-axis direction) of the movable portion 22a.

The other link portion 25a is formed of a leaf spring 30a. The link portion 25a extends along the Y-axis and its longitudinally opposite ends are connected to the first supporting portion 10 and movable portion 22a, individually.

The link portions 24a and 25a constitute a parallel link. The movable portion 22a can perform equivalent linear motions or the like around the elastic hinges 27a and 28a and leaf spring 30a, based on elastic deformations of the elastic hinges and elastic deformation (deflection) of the leaf spring. Thus, the movable portion 22a is supported for movement relative to the first supporting portion 10a along the X-axis.

The first piezoelectric element 14a is substantially in the form of a prism as a whole and is displaceable along its operation axis. The first piezoelectric element 14a is mounted on the first supporting portion 10a outside the first displacement magnifying mechanism 16a. One end of the first piezoelectric element 14a is secured to the pedestal portion 10c of the support base 10. The other end of the first piezoelectric element 14a is connected to the proximal end portion of the link portion 24a by a lever mechanism 34a comprising an elastic hinge 32a. Thus, the first piezoelectric element 14a is located between the first supporting portion 10a and first displacement magnifying mechanism 16a in such a manner that its operation axis extends along the X-axis, that is, it extends parallel to the moving direction of the movable portion 22a.

The first supporting portion 10a of the support base 10, movable portion 22a of the first displacement magnifying mechanism 16a, link portions 24a and 25a, elastic hinges 27a, 28a and 32a, and lever mechanism 34a consist mainly of a highly stiff metallic material, such as titanium alloy steel, duralumin (high-strength aluminum), stainless steel, or electrically conductive ceramics. The movable portion 22a, link portions 24a and 25a, elastic hinges 27a, 28a and 32a, and lever mechanism 34a function as movable mechanisms of the first displacement magnifying mechanism 16a.

If the longitudinal dimension of the link portion 24a between the respective centers of the elastic hinges 27a and 28a and the distance between the respective centers of the elastic hinge 32a of the lever mechanism 34a and the elastic hinge 27a on the side of the first supporting portion 10a are A and B, respectively, in the first displacement magnifying mechanism 16a, a small displacement of the first piezoelectric element 14a along the X-axis is magnified at a lever ratio of A/B at the movable portion 22a.

As shown in FIG. 7, the second displacement magnifying mechanism 16b is constructed substantially symmetrically with the first displacement magnifying mechanism 16a. The second displacement magnifying mechanism 16b comprises a prism-like movable portion (displacement magnifying portion) 22b and a pair of link portions 24b and 25b. The movable portion 22b is opposed substantially parallel to a longitudinal end portion of the second supporting portion 10b with a gap therebetween. The link portions 24b and 25b extend parallel to each other between the second supporting portion 10b and movable portion 22b. The movable portion 22b extends along the Y-axis and is located at a gap along the X-axis from the second supporting portion 10b. The pair of link portions 24b and 25b extend parallel to each other along the X-axis.

The link portion 24b is in the form of a prism, the longitudinally opposite ends of which are connected to the second supporting portion 10b and movable portion 22b by elastic hinges 27b and 28b, individually. The elastic hinges 27b and 28b are formed by slitting the opposite ends, thereby reducing their respective widths. About half the link portion 24b on the side of the movable portion 22b is tapered, and an opening is formed in this portion, thus forming a leaf spring structure connected by the elastic hinge 28b. The link portion 24b extends in the direction (X-axis direction) perpendicular to the moving direction (Y-axis direction) of the movable portion 22b.

The other link portion 25b is formed of a leaf spring 30b. The link portion 25b extends along the X-axis and its longitudinally opposite ends are connected to the second supporting portion 10b and movable portion 22b, individually.

The link portions 24b and 25b constitute a parallel link. The movable portion 22b can perform equivalent linear motions or the like around the elastic hinges 27b and 28b and leaf spring 30b, based on elastic deformations of the elastic hinges and elastic deformation (deflection) of the leaf spring. Thus, the movable portion 22b is supported for movement relative to the second supporting portion2 10b along the Y-axis.

The second piezoelectric element 14b is substantially in the form of a prism as a whole and is displaceable along its operation axis. The second piezoelectric element 14b has its one end secured to the proximal end portion of the first supporting portion 10a and extends along the Y-axis at a gap from the second supporting portion 10b. The other end of the second piezoelectric element 14b is connected to the proximal end portion of the link portion 24b by a lever mechanism 34b comprising an elastic hinge 32b. Thus, the second piezoelectric element 14b is located between the first supporting portion 10a and second displacement magnifying mechanism 16b in such a manner that its operation axis extends along the Y-axis, that is, it extends parallel to the moving direction of the movable portion 22b.

The second supporting portion 10b of the support base 10, movable portion 22b of the second displacement magnifying mechanism 16b, link portions 24b and 25b, elastic hinges 27b, 28b and 32b, and lever mechanism 34b consist mainly of a highly stiff metallic material, such as titanium alloy steel, duralumin (high-strength aluminum), stainless steel, or electrically conductive ceramics. The movable portion 22b, link portions 24b and 25b, elastic hinges 27b, 28b and 32b, and lever mechanism 34b function as movable mechanisms of the second displacement magnifying mechanism 16b.

If the longitudinal dimension of the link portion 24b between the respective centers of the elastic hinges 27b and 28b and the distance between the respective centers of the elastic hinge 32b of the lever mechanism 34b and the elastic hinge 27b on the side of the second supporting portion 10b are A and B, respectively, in the second displacement magnifying mechanism 16b, a small displacement of the second piezoelectric element 14b along the Y-axis is magnified at a lever ratio of A/B at the movable portion 22b.

The stage 12 is located between the first displacement magnifying mechanism 16a and second displacement magnifying mechanism 16b in the XY-plane. The stage 12 is disposed in a position where the moving direction X of the movable portion 22a of the first displacement magnifying mechanism 16a and the moving direction Y of the movable portion 22b of the second displacement magnifying mechanism 16b cross each other.

The stage 12 is connected to the movable portion 22a of the first displacement magnifying mechanism 16a by the first drive support mechanism 18a, and to the movable portion 22b of the second displacement magnifying mechanism 16b by the second drive support mechanism 18b. The stage 12 is supported for movement in the XY-plane by the first and second drive support mechanisms 18a and 18b.

The first drive support mechanism 18a comprises a parallel link 36a that functions as a drive support spring. The parallel link 36a is formed of, for example, a pair of parallel leaf springs. The pair of leaf springs individually extend along the X-axis or in the moving direction of the movable portion 22a and face each other with a gap therebetween along the Y-axis. One longitudinal end of the parallel link 36a is connected to the movable portion 22a of the first displacement magnifying mechanism 16a, and the other end to the stage 12. The parallel link 36a is highly rigid along the X-axis and a Z-axis, which extends at right angles to the XY-plane defined by the X- and Y-axes, and is flexible along the Y-axis perpendicular to the X-axis. Thus, the parallel link 36a keeps the stage 12 parallel, thereby avoiding rotation of the stage, and transmits the displacement of the movable portion 22a to the stage 12, thereby moving the stage 12 along the X-axis.

The parallel link 36a is not limited to the structure comprising the pair of parallel leaf springs, and it may alternatively be a parallel link that comprises elastic hinges formed by cutting both ends of a beam and other members.

The second drive support mechanism 18b comprises a parallel link 36b that functions as a drive support spring. The parallel link 36b is formed of, for example, a pair of parallel leaf springs. The pair of leaf springs individually extend along the Y-axis or in the moving direction of the movable portion 22b and face each other with a gap therebetween along the X-axis. One longitudinal end of the parallel link 36b is connected to the movable portion 22b of the second displacement magnifying mechanism 16b, and the other end to the stage 12. The parallel link 36b is highly rigid along the Y-axis and Z-axis and is flexible along the X-axis perpendicular to the Y-axis. The parallel link 36b transmits the displacement of the movable portion 22b to the stage 12, thereby moving the stage 12 along the Y-axis.

The parallel link 36b is not limited to the structure comprising the pair of parallel leaf springs, and it may alternatively be a parallel link that comprises elastic hinges formed by cutting both ends of a beam and other members.

As shown in FIG. 7, the stabilizing support mechanism 20 comprises a spring fixing portion 38, which is spaced apart from the stage 12 along the X-axis and Y-axis and fixedly disposed on the side opposite to the first and second drive support mechanisms 18a and 18b, and first and second stabilizing support springs 40a and 40b that connect the spring fixing portion and the stage 12.

The first and second stabilizing support springs 40a and 40b are formed of leaf springs, metal wires, or coil springs. The first stabilizing support spring 40a extends along the Y-axis and then the X-axis from the spring fixing portion 38 and is connected to the stage 12 on the side opposite to the parallel link 36a. The first stabilizing support spring 40a is elastic along the X-axis and Y-axis and highly rigid along the Z-axis. The second stabilizing support spring 40b extends along the X-axis and then the Y-axis from the spring fixing portion 38 and is connected to the stage 12 on the side opposite to the parallel link 36b. The second stabilizing support spring 40b is elastic along the X-axis and Y-axis and highly rigid along the Z-axis. The first and second stabilizing support springs 40a and 40b are substantially symmetric with respect to a line that passes through the stage 12 and spring fixing portion 38. In the present embodiment, both the first and second stabilizing support springs 40a and 40b are formed substantially in the shape of a rectangular frame. These first and second stabilizing support springs 40a and 40b constantly maintain tension and apply pulling tension to the stage 12 and parallel links 36a and 36b. In this way, the stabilizing support mechanism 20 suppresses a displacement of the stage 12 along the Z-axis and compressive displacements of the parallel links 36a and 36b, thereby stably supporting the stage 12 in the XY-plane.

The stabilizing support springs 40a and 40b are not limited to the substantially right-angled shape described above and may alternatively be of, for example, an arcuate shape. In short, they should only be shaped so that they can apply tension along the X-axis and Y-axis.

The following is a description of the operation of the planar positioning device constructed in this manner. FIG. 7 shows a state in which the stage 12 of the planar positioning device is in an initial position or reference position. In moving the stage 12 to and locating it in a desired position, voltage is applied to, for example, the first piezoelectric element 14a, thereby causing it to make a small displacement (or extension) along the X-axis. Thereupon, this small displacement is increased to a displacement of the movable portion 22a along the X-axis by the first displacement magnifying mechanism 16a. The displacement of the movable portion 22a is transmitted to the stage 12 by the parallel link 36a of the first drive support mechanism 18a, whereupon the stage 12 moves relative to the support base 10 along the X-axis in the XY-plane. If voltage is applied to the second piezoelectric element 14b, thereby causing it to make a small displacement (or extension) along the Y-axis, moreover, this small displacement is increased to a displacement of the movable portion 22b along the Y-axis by the second displacement magnifying mechanism 16b. The displacement of the movable portion 22b is transmitted to the stage 12 by the parallel link 36b of the second drive support mechanism 18b, whereupon the stage 12 moves relative to the support base 10 along the Y-axis in the XY-plane.

As this is done, the stabilizing support mechanism 20 constantly applies tension in the drive direction to displace the stage 12 and applies pulling tension to the stage 12 and parallel links 36a and 36b. In this way, the stabilizing support mechanism 20 suppresses a displacement of the stage 12 along the Z-axis and compressive displacements of the parallel links 36a and 36b, thereby stably supporting the stage 12 in the XY-plane.

Figure 8:
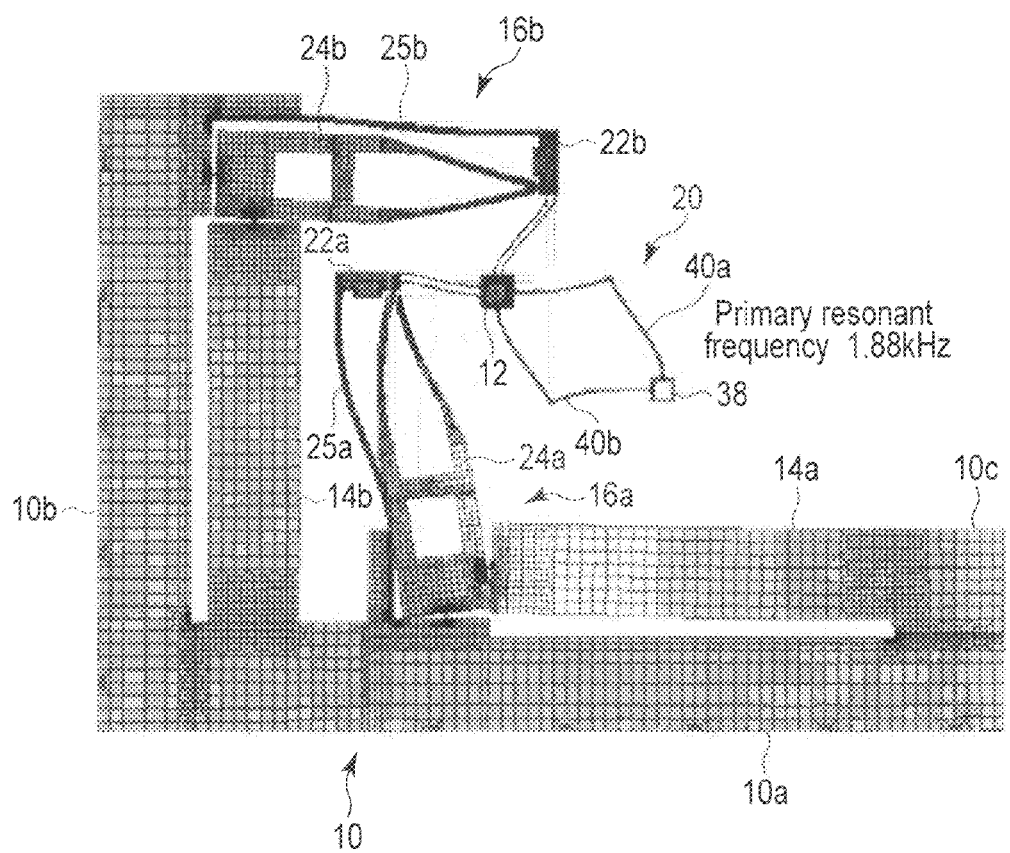
FIG. 8 is a diagram showing the result of a resonant frequency analysis based on the finite element method for the planar positioning device.

FIG. 8 shows the result of a primary resonant frequency mode for a resonant frequency analysis based on the finite element method (FEM analysis) performed for the performance evaluation of a planar positioning device (500 µm) designed for a maximum stage displacement amount of 500 µm. This result indicates that this planar positioning device can obtain a high resonant frequency based on a primary resonant frequency of 1.88 kHz.

Figure 9:
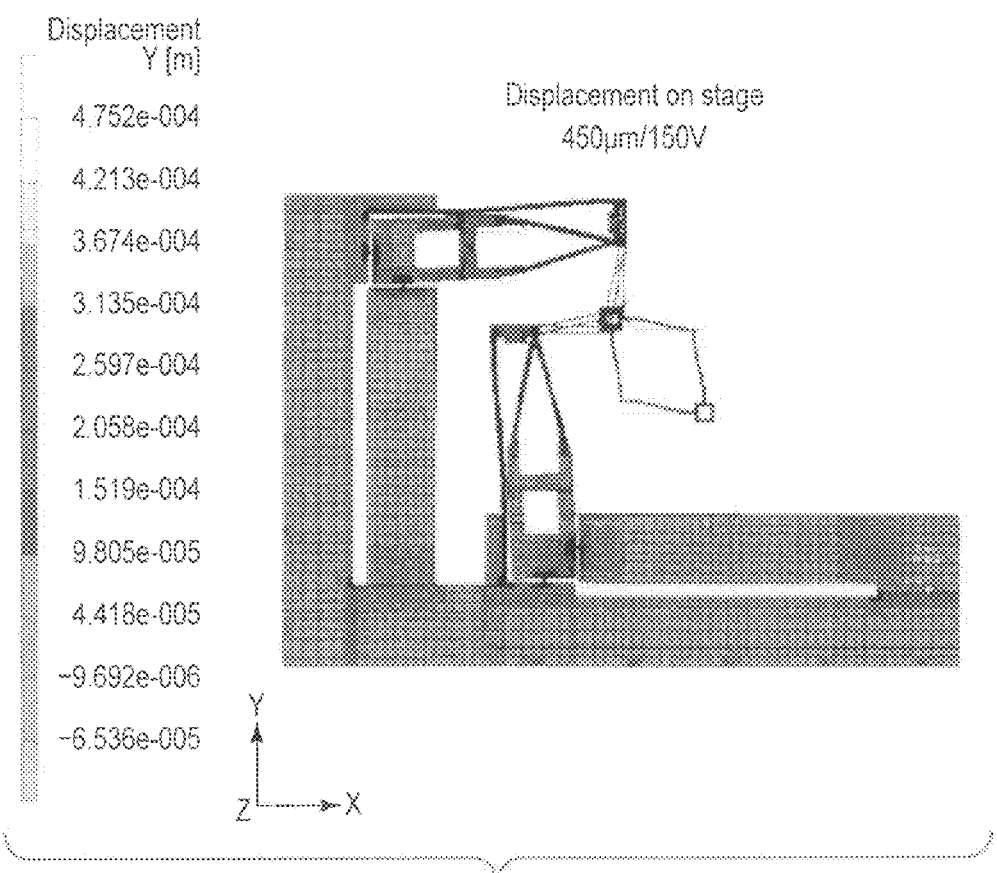
FIG. 9 is a diagram showing the result of a finite element method analysis of the displacement of the planar positioning device.

FIG. 9 shows the result of a FEM analysis of the maximum static displacement of the planar positioning device (500 µm) designed for the maximum stage displacement amount of 100 µm performed for the performance evaluation of the planar positioning device. This result indicates that magnified stage displacement amounts uy and ux obtained when voltage of 150 V is applied to the first and second piezoelectric elements is 450 µm.

The planar positioning device according to the second embodiment constructed in this manner can also provide the same function and effect as those of the foregoing first embodiment. Thus, there may be obtained a planar positioning device in which the magnified displacement amount can be increased and positioning can be achieved quickly and precisely while maintaining a high resonant frequency. Further, the selection and design flexibility of the actuator structure can be achieved independently. Even if an actuator with a large displacement amount is used, therefore, dimensional restrictions by the actuator can be avoided, so that a planar positioning device with a large operation area can be obtained. Furthermore, the present planar positioning device can provide a high resonant frequency and substantial displacement magnification and achieve control performance that can easily cope with higher performance of a movement mechanism for a scanning probe microscope or semiconductor inspection device, temperature drift, and disturbance compensation.

The following is a description of an embodiment in which an inspection device comprising a planar positioning device is applied to, for example, a scanning probe microscope.

Figure 11:
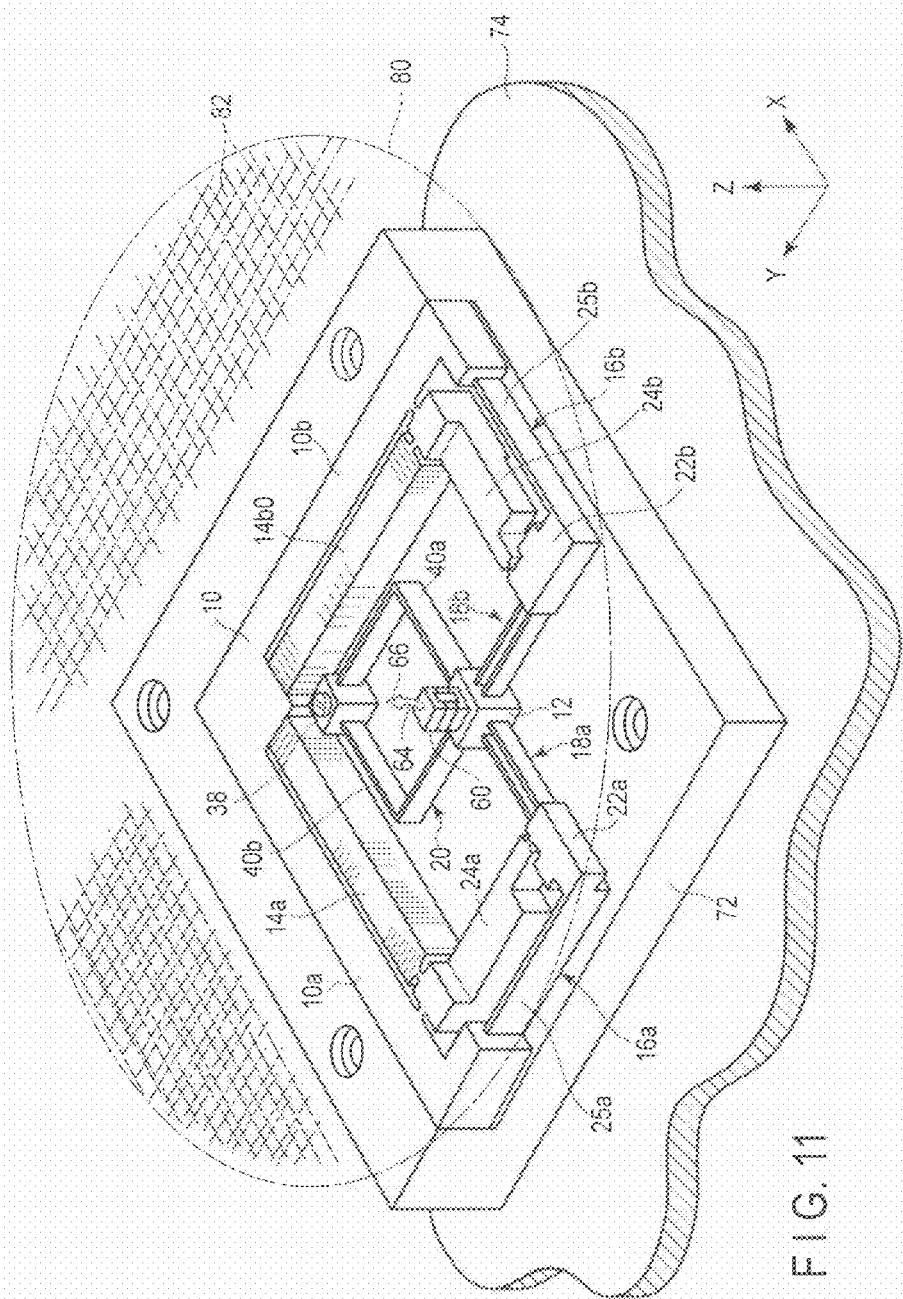
FIG. 11 is a perspective view showing a scanning probe microscope according to an embodiment of this invention.

FIG. 11 shows the scanning probe microscope (SPM) according to the present embodiment and a disk-like silicon wafer as a medium to be inspected. As shown in FIG. 11, the SPM comprises the planar positioning device described in connection with the first embodiment. The planar positioning device is constructed in the same manner as the one according to the foregoing first embodiment, so that like reference numbers are used to designate like portions, and a detailed description thereof is omitted. A support base 10 of the planar positioning device is fixedly supported on a support board 72 serving as a support. A spring fixing portion 38 of a stabilizing support mechanism 20 of the planar positioning device is secured to the support board 72. Further, the support board 72 is secured on a movable table 74. Thus, the planar positioning device is located in an XY-plane.

The SPM comprises a Z-axis stage 60 disposed on a stage 12 of the planar positioning device, cantilever 64 secured on the Z-axis stage, and probe 66 disposed on the distal end of the cantilever 64. The Z-axis stage 60 functions as a third actuator displaceable in an X-axis direction and a Z-axis direction perpendicular to the X-axis direction. Further, the SPM comprises an amplifier, detector, control unit, and display device. The amplifier amplifies tunnel current between the probe 66 and the medium to be inspected, which is assumed to be an example of a physical quantity to be inspected. The detector detects the amplified tunnel current. The control unit adjusts the distance between the probe 66 and the medium to be inspected and drives the planar positioning device to scan the probe 66. The display device displays the irregularities of a surface of the medium to be inspected, as an atom-level image, based on the measured tunnel current.

A large number of semiconductor circuits 82 are formed by exposure on the lower surface of a silicon wafer 80 as the medium to be inspected. The silicon wafer 80 is located and held in the XY-plane so that an area to be inspected of its lower surface faces the probe 66 of the SPM with a predetermined small gap therebetween. After the planar positioning device is moved to and located in a predetermined position relative to the silicon wafer 80 by the action of the movable table 74, the probe 66 of the SPM is further moved by small distances in the X- and Y-axis directions in the area to be inspected of the silicon wafer 80 by the planar positioning device, whereby the area to be inspected is scanned. During the scanning, the tunnel current flowing between the probe 66 and the surface of the silicon wafer 80 is measured, and semiconductor circuit patterns of the silicon wafer 80 are observed and displayed as atom-level images, based on the tunnel current.

The probe 66 may be scanned in such a manner that the distance between the probe 66 and silicon wafer 80 is kept constant or that the probe 66 is moved up and down in accordance with the irregularities of the surface of the silicon wafer 80 to keep the tunnel current constant, thereby achieving scanning in the X- and Y-axis directions.

According to the SPM constructed in this manner, the probe 66 is positioned by means of the above-described planar positioning device. Thus, the scanning speed of the probe 66 can be made much higher than in the conventional case, and high-precision movement in the same plane can be achieved. For the stage using stacked piezoelectric elements, moreover, large scanning distance and range exceeding a 500-µm square area can be reconciled with a high resonant frequency. Therefore, the range of application can be extended to mainly cover those fields which require the manufacture and inspection of semiconductors and flat displays and monitoring in a wide range that has not been measurable by a conventional SPM. Thus, the application of SPMs can be extended to fields that require high-speed, high-precision on-line scanning techniques.

According to the above embodiments, there is obtained a planar positioning device, in which the magnified displacement amount can be increased and positioning can be achieved quickly and precisely while maintaining a high resonant frequency, and an inspection device provided with the same. The planar positioning device can provide a high resonant frequency and substantial displacement magnification and achieve control performance that ensures higher speed and precision of a movement mechanism used for a scanning probe microscope or semiconductor inspection device and can easily cope with temperature drift and disturbance compensation.

The present invention is not limited directly to the embodiments described herein, and in carrying out the invention, higher performance can be achieved by modifying the constituent elements or changing the structural materials without departing from the spirit of the invention. Further, various inventions can be formed by appropriately combining a plurality of constituent elements disclosed in the above-described embodiments. For example, some of the constituent elements according to the embodiments may be omitted. Furthermore, constituent elements according to different embodiments may be combined as required.

In the first and second embodiments, for example, the first displacement magnifying mechanism and second displacement magnifying mechanism may be omitted. In this case, the first drive support mechanism is disposed between the stage and first actuator, and the second drive support mechanism between the stage and second actuator.

Further, the shapes of the supporting portions, movable portions, and link portions that constitute the displacement magnifying mechanisms are not limited to the foregoing embodiments and may be changed as required. The leaf springs that constitute the link portions need not always be uniform ones and may alternatively be leaf springs whose sectional shapes vary longitudinally or transversely. Furthermore, each displacement magnifying mechanism may be formed of another pair of link configurations besides the leaf springs.

The lengths of the leaf springs and link portions may be adjusted by extending junctions between the leaf springs and link portions to the movable portion side at the supporting portions without regard to length A of the link portions. The actuators are not limited to the stacked piezoelectric elements and may alternatively be drive elements with the same thrust characteristics, such as other piezoelectric elements, magnetostrictive elements, and mechanisms based on electromagnetic force.

The inspection device according to this invention is not limited to the SPM and is also applicable to another inspection device, manufacturing apparatus, measuring machine, etc. Specifically, the planar positioning device according to the present invention is not limited to the inspection device and may also be used in a manufacturing apparatus, measuring machine, and various other apparatuses. Further, the SPM is not limited to the above-described scanning tunneling microscope (STM) and may be applied to an atomic force microscope (AFM) using atomic force or a scanning probe microscope based on another physical quantity as an index. In the foregoing embodiments, the planar positioning device of the SPM is not limited to the planar positioning device of the first embodiment, and the planar positioning device of the second embodiment may also be used for the purpose.

What is claimed is:

1. A planar positioning device comprising:
    a first actuator displaceable in a direction of a first axis;
    a second actuator displaceable in a direction of a second axis perpendicular to the first axis;
    a first displacement magnifying mechanism configured to magnify a displacement of the first actuator in the first-axis direction;
    a second displacement magnifying mechanism configured to magnify a displacement of the second actuator in the second-axis direction;
    a stage arranged in a plane parallel to the first axis and the second axis;
    a first drive support mechanism comprising a parallel link connected between the first displacement magnifying mechanism and the stage to extend in the first-axis direction, supporting the stage in the plane, and configured to transmit the displacement in the first-axis direction, magnified by the first displacement magnifying mechanism, to the stage;
    a second drive support mechanism comprising a parallel link connected between the second displacement magnifying mechanism and the stage to extend in the second-axis direction, supporting the stage in the plane, and configured to transmit the displacement in the second-axis direction, magnified by the second displacement magnifying mechanism, to the stage; and
    a stabilizing support mechanism supporting the stage and configured to apply tensions in the first-axis direction and the second-axis direction to the stage.

2. The planar positioning device of claim 1, wherein the parallel link of the first drive support mechanism is flexible in the second-axis direction perpendicular to the first-axis direction and rigid in the first-axis direction and a Z-axis direction perpendicular to an XY-plane defined by the first axis and the second axis, and the parallel link of the second drive support mechanism is flexible in the first-axis direction perpendicular to the second-axis direction and rigid in the second-axis direction and the Z-axis direction.

3. The planar positioning device of claim 2, wherein the parallel link of the first drive support mechanism comprises a pair of parallel leaf springs connected between the stage and the first displacement magnifying mechanism, and the parallel link of the second drive support mechanism comprises a pair of parallel leaf springs connected between the stage and the second displacement magnifying mechanism.

4. The planar positioning device of claim 2, wherein the stabilizing support mechanism comprises a spring fixing portion, a first stabilizing support spring connected between the spring fixing portion and the stage, configured to apply tension along the first axis to the stage, and having rigidity along the Z-axis, and a second stabilizing support spring connected between the spring fixing portion and the stage, configured to apply tension along the second axis to the stage, and having rigidity along the Z-axis.

5. The planar positioning device of claim 4, wherein the first stabilizing support spring and the second stabilizing support spring are formed and arranged symmetrically with respect to a line passing through the stage and the spring fixing portion.

6. The planar positioning device of claim 1, wherein the first actuator and the second actuator are stacked piezoelectric elements.

7. A planar positioning device comprising:
a stage movable in a plane having a direction of a first axis and a direction of a second axis perpendicular the first axis;
a first actuator configured to produce a displacement in the first-axis direction;
a second actuator configured to produce a displacement in the second-axis direction;
a first drive support mechanism comprising a parallel link connected between the first actuator and the stage to extend in the first-axis direction, supporting the stage, and configured to transmit the displacement of the first actuator in the first-axis direction to the stage;
a second drive support mechanism comprising a parallel link connected between the second actuator and the stage to extend in the second-axis direction, supporting the stage, and configured to transmit the displacement of the second actuator in the second-axis direction to the stage; and
a stabilizing support mechanism connected to the stage, supporting the stage, and configured to apply tensions in the first-axis direction and the second-axis direction to the stage.

8. The planar positioning device of claim 7, wherein the parallel link of the first drive support mechanism is flexible in the second-axis direction perpendicular to the first-axis direction and rigid in the first-axis direction and a Z-axis direction perpendicular to an XY-plane defined by the first axis and the second axis, and the parallel link of the second drive support mechanism is flexible in the first-axis direction perpendicular to the second-axis direction and rigid in the Z-axis direction.

9. The planar positioning device of claim 8, wherein the stabilizing support mechanism comprises a fixedly-disposed spring fixing portion, a first stabilizing support spring connected between the spring fixing portion and the stage, configured to apply tension along the first axis to the stage, and having rigidity along the Z-axis, and a second stabilizing support spring connected between the spring fixing portion and the stage, configured to apply tension along the second axis to the stage, and having rigidity along the Z-axis.

10. The planar positioning device of claim 7, wherein the first actuator and the second actuator are stacked piezoelectric elements.

11. The planar positioning device of claim 1, wherein the first displacement magnifying mechanism comprises a first movable portion movable in the first-axis direction and parallel links connected between the first movable portion and a supporting portion to extend in the second-axis direction, one of the links being connected to the movable portion by an elastic hinge, the parallel link of the first drive support mechanism being connected between the first movable portion and the stage, and the second displacement magnifying mechanism comprises a second movable portion movable in the second-axis direction and parallel links connected between the second movable portion and the supporting portion and extending in the first-axis direction, one of the links being connected to the second movable portion by an elastic hinge, the parallel link of the second drive support mechanism being connected between the second movable portion and the stage.

12. An inspection device for scanning and inspecting an inspecting area of a surface of a medium to be inspected, comprising:
a probe configured to oppose the inspecting area of the medium; and
the planar positioning device according to claim 1, configured to support and scan the probe.

13. The inspection device of claim 12, further comprising a Z-axis table provided on the stage of the planar positioning device and displaceable in a Z-axis direction, and a cantilever mounted on the Z-axis table, the cantilever supporting the probe.

14. An inspection device for scanning and inspecting an inspecting area of a surface of a medium to be inspected, comprising:
a probe configured to oppose the inspecting area of the medium; and
the planar positioning device according to claim 7, configured to support and scan the probe.

* * * * *